United States Patent

Bianchi et al.

[11] Patent Number: 5,384,043
[45] Date of Patent: Jan. 24, 1995

[54] SKIMMER HAVING A RETRACTABLE DYNAMIC INCLINED PLANE

[75] Inventors: Ralph A. Bianchi, Stoneham, Mass.; Walter P. Sarnacki, Searsport; Robert L. Watkins, Blue Hill, both of Me.

[73] Assignee: JBF Scientific Company, Inc., Winchester, Mass.

[21] Appl. No.: 68,631

[22] Filed: May 27, 1993

[51] Int. Cl.⁶ .................................. E02B 15/04
[52] U.S. Cl. ........................... 210/242.3; 210/923
[58] Field of Search ............... 210/242.3, 242.4, 776, 210/923, 924; 114/345

[56] References Cited

U.S. PATENT DOCUMENTS

| | | | |
|---|---|---|---|
| Re. 30,729 | 9/1981 | Farrell et al. | 210/923 |
| 3,536,199 | 10/1970 | Cornelius | 210/242.3 |
| 3,615,017 | 10/1971 | Valdespino | 210/242.3 |
| 3,637,080 | 1/1972 | Markel | 210/923 |
| 3,716,142 | 2/1973 | Bianchi | 210/923 |
| 3,730,346 | 5/1973 | Prewitt | 210/242.3 |
| 3,762,558 | 10/1973 | Anderson | 210/242.3 |
| 4,061,569 | 12/1977 | Bennett et al. | 210/923 |
| 4,316,806 | 2/1982 | Canevari | 210/923 |
| 4,348,971 | 9/1982 | Montgomery | 114/345 |
| 4,628,854 | 12/1986 | Harding | 114/345 |
| 4,782,777 | 11/1988 | Sussman | 114/345 |
| 5,028,325 | 7/1991 | Hamilton | 210/242.3 |
| 5,043,065 | 8/1991 | Propp | 210/242.3 |
| 5,215,654 | 6/1993 | Karterman | 210/242.3 |

Primary Examiner—Christopher Upton
Attorney, Agent, or Firm—Cesari and McKenna

[57] ABSTRACT

An oil skimmer (10) employs a dynamic-inclined-plane module (22) that is retractable so that it can be kept suspended above the water during skimmer travel to and from oil-spill sites. The thrust required of the skimmer's propulsion system to achieve a given transit speed is thus much lower than that required by conventional dynamic-inclined-plane systems. When the skimmer (10) reaches the oil-recovery site, the retracting mechanism (26) lowers the dynamic-inclined plane module to its operating depth. To enable the skimmer to operate dose to shore, its primary buoyancy is provided by inflatable pontoons (12), which result in shallow draft and relatively low vulnerability to hull damage.

2 Claims, 2 Drawing Sheets

SKIMMER HAVING A RETRACTABLE DYNAMIC INCLINED PLANE

BACKGROUND OF THE INVENTION

The present invention is directed to recovery of floatage, mainly oil after a spill. It is directed particularly to skimmers employed for that purpose.

The job of cleaning up oil spills tends to be complex and inelegant. Reclaiming land that has been subjected to spills can include bulldozing the oil-coated soil, rocks, etc. into dump trucks and disposing of the resulting fouled debris, usually in a manner that is not entirely satisfactory environmentally. It may also include spreading straw to absorb the oil and then retrieving the oil-laden straw. This approach is ordinarily quite labor-intensive and far from thorough. Another approach involves using water or steam from high-pressure hoses to drive oil off the rocks and other earth that it covers. Often, a combination of these approaches appears to be required.

Not only are these approaches generally inelegant, but the manner in which spills often occur significantly detracts from their effectiveness. Most require a fair amount of equipment, much of it heavy, such as trucks, holding tanks, pumps, and other equipment that is difficult to move rapidly to a spill site. Moreover, many beaches that must be cleaned are remote from all roads. Some are even on islands that have no roads at all. And the terrain on and near some beaches is so rugged that there is little or no place to put the required heavy equipment.

Because such considerations significantly restrict activities ashore, it may not be feasible to provide for storage of the recovered oil on land near the recovery site. In such cases, another dimension is added to the problem, because activities onshore may have to be coordinated with those of skimming vessels used to recover oil driven from the beach into the sea by, say, high-pressure hoses and then somehow "herded" out to the skimming vessel's operating depth.

Complicating these logistical problems is the fact that recovery becomes more difficult if it is delayed: exposure to the sun for any significant length of time tends to give the oil a tar-like consistency, which makes it hard to remove from rocks and other matter to which it has adhered.

As a practical matter, oil from spills will almost inevitably reach land. For one thing, circumstances often seem to conspire to impose a significant delay between the spill's occurrence and the time when removal personnel are apprised of it. Furthermore, safety considerations dictate that some time elapse between the spill and entry of motorized vessels on the scene: volatiles from the spill can make the vessels' engines receive too rich a fuel mixture.

For all of the reasons mentioned above, however, it is best if as much oil as possible is recovered while it is still out at sea, since recovery at sea is not nearly as complex as recovery on land. But even sea-surface recovery is challenging. Recovery of oil from the sea surface requires an even faster response than recovery from beaches in many cases if beach fouling is to be kept to a minimum.

Additionally, oil recovery at sea has itself tended to require a considerable amount of costly equipment. This results partially from the fact that the rate at which oil can be recovered depends on the rate at which the skimmer can deal with the resultant recovered liquid. If the skimmer is small and its storage capacity is therefore low, a high recovery rate means one of two things: either the skimmer must make frequent trips to shore to off-load the recovered liquid, or other vessels must make frequent trips to and from the skimmer. The frequency of these trips is reduced only at the cost of providing large storage tanks on the skimmer.

One approach that greatly ameliorates this problem is the one represented by skimmers that employ what are known as "dynamic inclined planes" ("DIPs"). The DIP approach, described in detail in U.S. Pat. Nos. 3,716,142 to Bianchi and 3,804,251 to Farrell et al., employs an endless conveyor belt partially submerged in the water so as to provide a lower belt surface that is inclined and travels from a forward position above the surface to a rearward position beneath the water. The rate of belt travel so matches the speed of the skimmer through the water that floatage, such as oil, tends to be submerged by the conveyor belt and travel back along it until the floatage reaches the rear of the belt, where it floats upward into an open-bottom collection tank, from which it is pumped to (typically onboard) storage.

The oil depth thus achievable in the collection tank greatly exceeds that which results from the concentrator booms employed in other approaches, and pumps that draw the oil from the collection tank into the vessel's storage tank thereby tend to draw fluid in which the oil concentration is, on the average, five times as great as that drawn in other approaches. The pumps, pipes, and storage tanks employed in DIP-type skimmers can therefore be much smaller for a given capacity than those that competing approaches require. Moreover, this advantage tends to propagate itself through the processing chain, tending to require less transport tonnage and less decanting and other equipment at the ultimate processing center.

The DIP approach has accordingly enjoyed significant acceptance in a number of applications. Despite its advantages, however, there are a number of applications on which operators have been unable to use it. This is a result of the fact that smaller DIP skimmers do not lend themselves to rapid deployment; over the years it has generally proved true that increases in a DIP skimmers' speed capacity are obtained at the cost of significant increases in size and thus in expense. While the DIP approaches other advantages justify this additional size and cost for high-capacity applications, it has been necessary to settle for low vessel speed when low-capacity applications are involved, and this compromise is not always acceptable. Even in some large spills, moreover, the diffuse oil distribution makes it preferable to use many small skimmers instead of only a few large ones. Throughout its history, therefore, the range of applications in which the DIP skimmer has been used has been limited because of deployment considerations.

SUMMARY OF THE INVENTION

One aspect of the present invention greatly reduces the speed limitations that have heretofore restricted the DIP method's range of applicability. According to this aspect of the invention, a DIP skimmer is provided with equipment for raising and lowering the DIP module, including at least the submersible conveyor belt. The DIP equipment is immersed to the normal depth for skimming, but it is retracted for traveling to and from spill sites. This greatly reduces the vessel's drag and thus the thrust required for a given speed. Because of the lower thrust requirement, a DIP skimmer that employs this aspect of the present invention can be realized in a vessel much smaller and less expensive than that required for the same speed in a conventional DIP skimmer.

A specific embodiment of this aspect of the invention may employ a second aspect of the invention, which can greatly aid in situations in which the oil spill has already reached the shore. According to this aspect of the invention, the skimmer vessel employs inflatable pontoons to achieve much of its buoyancy. Such a skimmer can be brought very close to the shore; not only can such craft be provided with shallow drafts, but they are also much less subject to the damage to which conventional-hulled craft are particularly vulnerable in the shallow waters normally encountered near shore. The problem of "herding" the oil to the skimmer is thus greatly simplified. Moreover, the hoses employed for cleaning oil from the shore can be driven by pumps on the vessels themselves. This eliminates much of the difficulty that can be encountered when equipment must be installed on shore.

BRIEF DESCRIPTION OF THE DRAWINGS

These and further features and advantages of the present invention are described below in connection with the accompanying drawings, in which.

DETAILED DESCRIPTION OF AN ILLUSTRATIVE EMBODIMENT

A skimmer 10 that employs the teachings of the present invention takes the form of a pontoon boat whose primary buoyancy is provided by two inflatable pontoons 12. By providing the skimmer 10 as a pontoon boat, one achieves a shallow draft, which enables the skimmer to operate close to shore and thus easily to recover oil driven back out to sea from the shore. The ability of the skimmer 10 to operate easily near the shore is further enhanced by the fact that the pontoons are inflatable, flexible members, which act as fenders and make the vessel much less susceptible to damage from rocks and collisions with other vessels than it would be if it were provided with a conventional hull. The pontoons typically form a plurality of isolated air chambers and be made, for instance, of Mil-C-14505, type 7, 60-oz./yd.$^2$ fabric overlaid on the bottom with a nitrile-polyvinylchloride gum sheet for oil resistance. The pontoon may additionally be provided with a stand-off strake 14, above which the fabric is coated with a hypalon gum sheet.

The remainder of the vessel main body is supported on the pontoons 12 and includes a wheel house 16 that provides shelter for an operator and houses the various controls that he uses.

Figure 2:
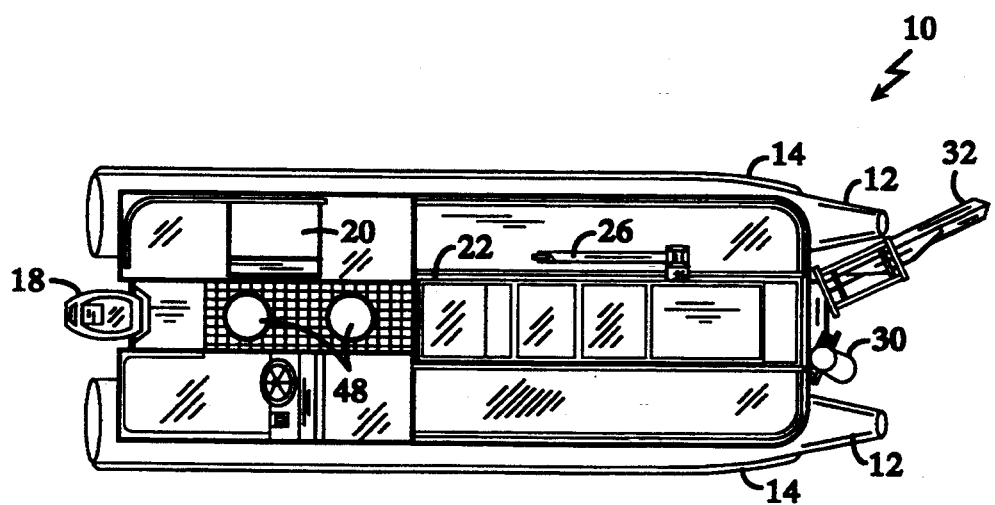
FIG. 2 is a plan view of the skimmer with the wheel house removed.

FIG. 2 depicts the location of a diesel outboard motor 18, which provides propulsion for the craft, and a hatch 20, which provides access to a hydraulic power pack. The power pack drives several parts of a dynamic-inclined-plane ("DIP") module 22 retractably supported above a tunnel 24 (FIG. 3) formed by the pontoons 14.

Figure 1:
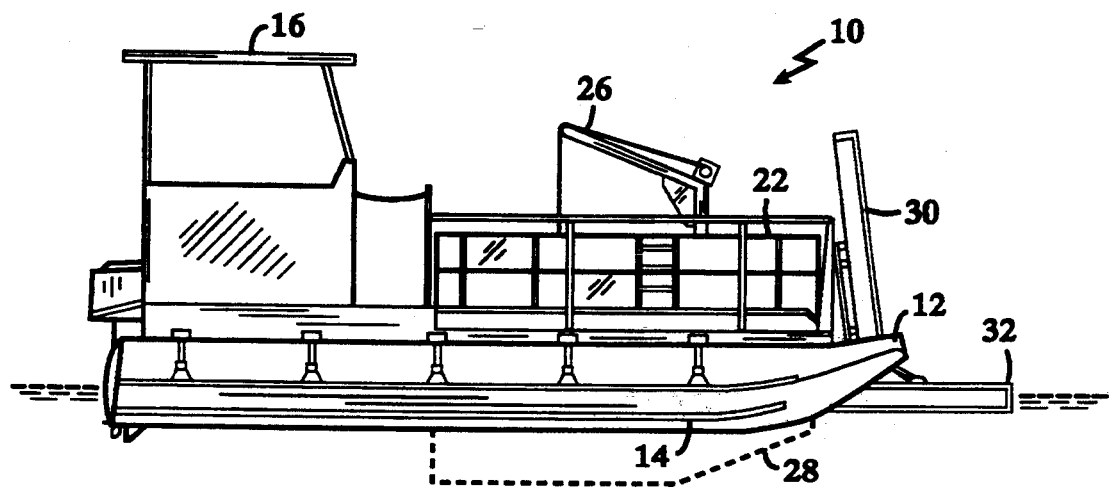
FIG. 1 is a side elevational view of an oil skimmer that employs the teachings of the present invention.
Figure 3:
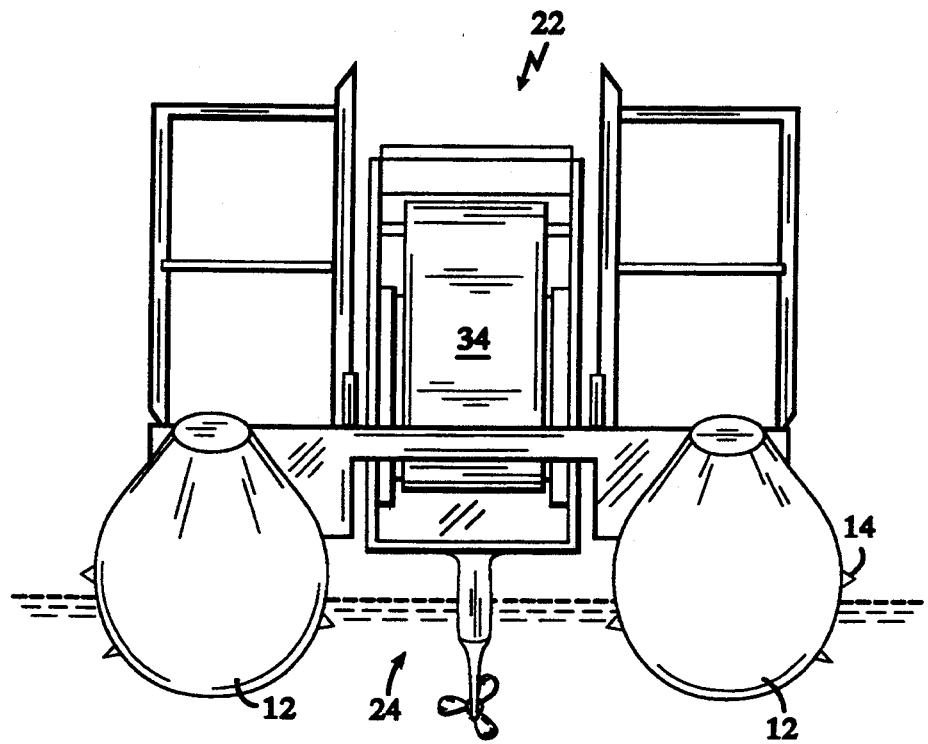
FIG. 3 is a front elevational view of the skimmer with the wheel house removed.
Figure 4:
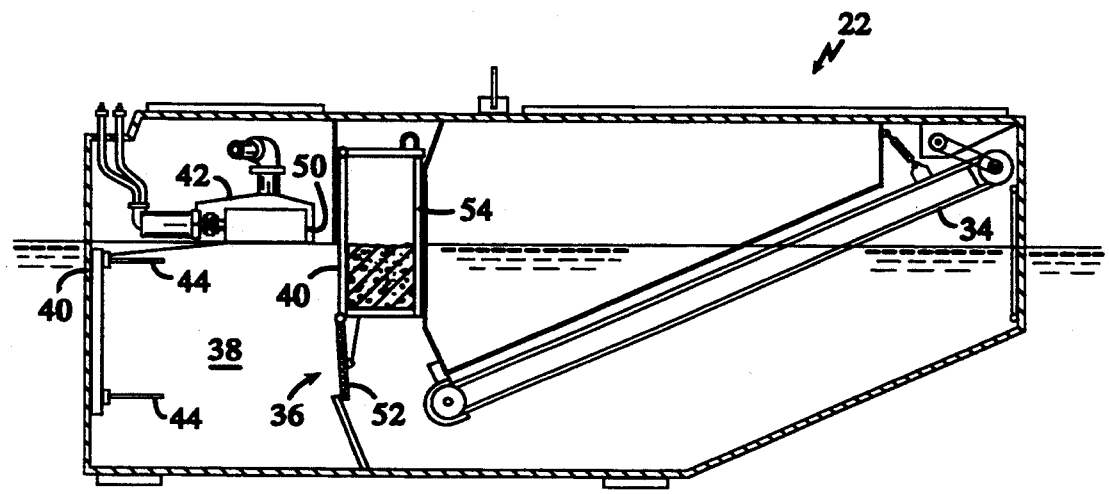
FIG. 4 is a side sectional view of the dynamic-inclined-plane module that the skimmer employs.

According to the present invention, the DIP module can be supported in this retracted position, in which, as FIG. 3 indicates, it is not immersed in the water. With the DIP module in this retracted state, the vessel can be propelled relatively rapidly to its point of operation, because the DIP module does not present the high drag that it does in conventional DIP-type skimmers. When the skimmer reaches the spill location, the retractor 26 lowers the DIP module to a position depicted in FIG. 1 by dashed lines 28 and shown in more detail in FIG. 4.

When the DIP module 22 is in this position, it is disposed in the tunnel 24 (FIG. 3) that the pontoons 12 form, and it is partially immersed. As the vessel is propelled forward, floating oil enters this tunnel 24, possibly after being directed into it by sweep booms 30 and 32. For purposes of explanation, boom 30 is shown in its raised position, while boom 32 is shown deployed. During oil-recovery operations, of course, both booms 30 and 32 are typically deployed, and they are both raised during travel to and from the spill site.

As is described in the Bianchi and Farrell et al. patents mentioned above, the DIP module includes a submersion conveyor 34 in the form of an endless belt whose downward-facing portion moves rearward at a speed that roughly matches the skimmer's speed through the water. The belt thereby tends to entrain oil and draw it rearward and downward. When the floatage reaches the rear end of the submersion conveyor 34, it tends to rise, continuing rearward with respect to the skimmer, so that it travels through the entrance 36 of a collection well 38 formed by collection-well walls 40 that extend vertically both below and above the water line and thus tend to trap floatage. The collection well is open at the bottom so that water and other non-buoyant material is not so trapped, and floatage thereby concentrates in the collection well 38.

When the DIP module is initially lowered to its immersed position, a pump 42 disposed at the surface of the collection well is connected to hydraulic conduits from the hydraulic power pack, which thereby drives the pump, possibly under the control of a control system, not shown, that employs as control inputs the outputs of oil probes 44. These probes indicate the depth of the oil that has concentrated in the collection well. If the depth is adequate, the pump is operated to pump oil from the collection well 38 to a recovered-oil storage tank 46, which can be seen disposed between the pontoons in FIG. 3 and is evidenced by its access hatches 48 in FIG. 2. Because the DIP method results in a very thick layer of oil in the collection well, the oil concentration in the fluid sent to the storage tank 46 is much higher than it is in the corresponding fluid that results from non-DIP skimmers, so the storage-tank volume required for a given amount of oil recovery is only a fraction of that needed by most other skimming approaches.

Although the oil concentration in the collection well 38 is quite high, the well also tends to collect (a typically relatively minor amount of) other floatage, too. Although the absolute volume of this extraneous floatage is usually not so great as to reduce the storage efficiency of the DIP skimmer significantly, it can include solid objects that are larger than the pump 42 can handle. For this reason, some versions of the skimmer may include a grinder 50 disposed at the mouth of the pump 42 so as to reduce solid-floatage particle size to within the range that the pump can handle.

The grinder 50 will also have size limitations, so the collection well 38 can gradually accumulate relatively large objects, and operation might accordingly have to be interrupted in order to clear the objects from the collection well. In some versions of the invention, therefore, a debris screen 52 may be placed at the collection-well entrance 32 and thus virtually eliminate the need for any such debris removal. The screen would comprise mesh of a size small enough to prevent entry of objects larger than those that the grinder 50 can handle. The screen 52 may conveniently be provided as a gate to a removable debris trap 54, which has closed sides and an open top, its bottom being formed by the gate 52. In the position shown, large particles delivered to the collection-well entrance 36 by the submersion conveyor 34 are denied entry to the collection well 38, and, being floatage, tend to float upward into the debris-trap interior, where they accumulate. When the debris trap is full, the gate 52 is raised to form a closed bottom on the debris trap 54, and the debris trap is then removed from the remainder of the module and emptied. It is then returned to its depicted position, with the gate 52 open to act as an entrance screen for the collection well 38.

It is apparent that a skimmer such as that depicted in the drawings can be used to solve a number of the problems that presently afflict oil-recovery operations. It provides the advantages of the DIP method and yet, because the DIP module is retractable, the power required to achieve relatively high vessel speeds in reaching an oil-recovery site can be a fraction of that required by previous DIP skimmers. As a consequence, such a rapid-travel skimmer can be embodied in a vessel whose small size enables it to operate effectively in near-shore environments. This near-shore capability is enhanced by embodying the skimmer in a vessel whose primary buoyancy is provided by inflatable pontoons, which support a relatively high weight for a given draft and additionally are considerably less vulnerable to hull damage than conventional-hulled craft are.

By having the ability to operate dose into shore, such a skimmer can eliminate the need for most of the effort that would otherwise be required to guide to the skimmer oil that has been driven from the shore. Moreover, this dose-in capability makes it practical to support from the skimmer some operations that previously required shore support. For instance, water hoses used to drive oil from the shore into the sea can be driven from pumps on the skimmer, thus eliminating the need to power them from shore facilities. It is thus apparent that the present invention constitutes a significant advance in the art.

We claim:

1. A skimming vessel for operation in water comprising:
   A) a vessel main body for floating upon the water and providing support for all other components of the skimming vessel, said body having forward and aft ends whereby said body is more efficiently propelled in the forward direction than in the rearward direction;
   B) a retractable oil-collection module retractably mounted in the main body for raising and lowering between retracted and immersed positions with respect to the surface of the body of water on which the main body floats, the module comprising:
      i) collection-well walls forming a collection well having a collection-well entrance that is submerged when the module is in its immersed position, the walls so extending above the water surface when the module is in its immersed position as to prevent floatage from floating out of the well on the water's surface; and
      ii) a submersion conveyer, including an endless submersion belt, for driving the submersion belt in an endless path that has an inclined path portion that, when the module is in its immersed position, leads rearward from a relatively forward position above the water surface to a relatively rearward position below the water surface and adjacent the collection-well entrance,
   whereby the submersion conveyer draws to the collection-well entrance floatage impelled against it by the vessel's forward motion, and the floatage thus submerged enters the collection well and is retained therein when the vessel moves forward; and
   C) a module retractor, mounted on the main body, for raising and lowering the oil-collection module between its immersed position and its retracted position, in which the module is suspended above the surface of the water surface.

2. A skimming vessel as defined in claim 1 wherein the vessel main body comprises a plurality of inflatable pontoons on which the remainder of the main body is supported when the vessel main body is placed in a body of water.

* * * * *